(12) United States Patent
Choi

(10) Patent No.: US 10,815,938 B2
(45) Date of Patent: Oct. 27, 2020

(54) METHOD FOR DIAGNOSING LEAKAGE OF FUEL VAPOR PURGE SYSTEM

(71) Applicants: Hyundai Motor Company, Seoul (KR); Kia Motors Corporation, Seoul (KR)

(72) Inventor: Choo Saeng Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 59 days.

(21) Appl. No.: 16/197,422

(22) Filed: Nov. 21, 2018

(65) Prior Publication Data
US 2020/0003164 A1   Jan. 2, 2020

(30) Foreign Application Priority Data

Jul. 2, 2018 (KR) .................. 10-2018-0076415

(51) Int. Cl.
| F02M 25/08 | (2006.01) |
| F02D 41/18 | (2006.01) |
| F02D 41/00 | (2006.01) |
| G07C 5/08  | (2006.01) |

(52) U.S. Cl.
CPC ..... *F02M 25/0827* (2013.01); *F02D 41/0045* (2013.01); *F02D 41/182* (2013.01); *G07C 5/0808* (2013.01)

(58) Field of Classification Search
CPC .............. F02D 41/004; F02D 41/0045; F02M 25/0836; F02M 25/0872; F02M 25/089
See application file for complete search history.

(56) References Cited

U.S. PATENT DOCUMENTS

| 2006/0179928 | A1* | 8/2006 | Shikama ............ F02M 25/0809 73/114.39 |
| 2011/0307157 | A1* | 12/2011 | Pursifull ............. F02D 41/0007 701/102 |
| 2014/0096749 | A1* | 4/2014 | Pearce .................. F02D 41/004 123/520 |
| 2015/0159597 | A1* | 6/2015 | Woods ................ F02M 25/089 123/495 |
| 2015/0292421 | A1* | 10/2015 | Pursifull .............. F02D 41/004 123/518 |
| 2016/0123280 | A1* | 5/2016 | Makino ................ F02M 25/089 123/519 |
| 2016/0131063 | A1* | 5/2016 | Kogo .................. F02D 41/1462 60/276 |
| 2016/0305352 | A1* | 10/2016 | Pursifull ............. F02D 41/0007 |

(Continued)

*Primary Examiner* — Sizo B Vilakazi
*Assistant Examiner* — Anthony L Bacon
(74) *Attorney, Agent, or Firm* — Mintz Levin Cohn Ferris Glovsky and Popeo, P.C.; Peter F. Corless

(57) ABSTRACT

A method for diagnosing leakage of a fuel vapor dual purge system is provided. The method includes determining whether an operation region of a vehicle is an operation region in which a turbocharger is operated and adjusting a flow amount of intake air flowing into the turbocharger according to an operation region in which the turbocharger is operated. A hydrocarbon collecting amount of a canister connecting fuel vapor generated in the fuel tank is calculated and a flow amount of the fuel vapor passing first and second purge lines is adjusted. A leak of the fuel vapor is diagnosed in the first purge line and the second purge line.

6 Claims, 5 Drawing Sheets

(56) References Cited

U.S. PATENT DOCUMENTS

2016/0341155 A1* 11/2016 Dudar ................... F02B 37/164
2018/0223762 A1*  8/2018 Insixiengmai ........ F02D 41/222
2019/0271284 A1*  9/2019 Sugiura ................ F02M 25/089

* cited by examiner

METHOD FOR DIAGNOSING LEAKAGE OF FUEL VAPOR PURGE SYSTEM

CROSS-REFERENCE TO RELATED APPLICATION

This application claims priority to and the benefit of Korean Patent Application No. 10-2018-0076415 filed on Jul. 2, 2018, the entire contents of which are incorporated herein by reference.

BACKGROUND

(a) Field of the Invention

The present invention relates to a method of diagnosing a leakage of a fuel vapor purge system, and more particularly, to a method of correctly diagnosing a fuel vapor leakage of a fuel vapor purge system.

(b) Description of the Related Art

To enhance an exhaust gas, research has been conducted in the vehicle industry, and particularly, to minimize discharge of hydrocarbons (HC) among evaporation gas components of gasoline fuel, various countries have adapted regulations that regulate a total amount of fuel evaporation gas to 0.5 g/day or less, and are scheduled to sequentially reduce a total amount of fuel evaporation gas to 0.054 g/day or less.

Generally, to cooperate with such regulations, by improving a material of a fuel tank and optimizing a connection structure thereof, occurrence of a fuel evaporation gas that penetrates the fuel tank has been minimized, and a fuel evaporation gas recirculation apparatus in which a canister is applied to a fuel supply apparatus has been used. In particular, the canister contains an adsorbent material capable of absorbing a fuel evaporation gas from a fuel tank that stores a volatile fuel, and to prevent fuel evaporation gas that evaporates from a float chamber of a carburetor and the fuel tank from being discharged to the air, the canister is connected with the fuel tank to collect the fuel evaporation gas.

Accordingly, the fuel evaporation gas that is collected in the canister is again injected into the engine through a purge control solenoid valve (PCSV) that is operated by an engine controller/control unit (hereinafter referred to as an 'ECU') to be burned, and thus the fuel evaporation gas is recirculated. Since the fuel vapor purge system according to a conventional art, to reduce environmental pollution by preventing a leak of a fuel evaporation gas, includes a first purge line connected to an intake manifold side from a fuel tank and a second purge line connected to a turbocharger side from the fuel tank, as the fuel evaporation gas of the fuel tank is supplied to the intake side of the engine through the first and second purge lines, the fuel evaporation gas flows into the engine along with external air to be combusted.

However, in the fuel vapor dual purge system, since there is a risk of causing environmental pollution while the fuel evaporation gas is leaked due to some cause such as aging or malfunction of parts or a connection part, it is necessary to improve productivity of the vehicle and to reduce the environmental pollution by correctly diagnosing leakage of the fuel evaporation gas through the dual purge line.

The above information disclosed in this section is merely for enhancement of understanding of the background of the invention and therefore it may contain information that does not form the prior art that is already known in this country to a person of ordinary skill in the art.

SUMMARY

The present invention provides a method for diagnosing the leakage of the fuel vapor dual purge system capable of reducing the environmental pollution due to the leakage of the fuel evaporation gas and improving the productivity of the vehicle by correctly diagnosing the leakage of the fuel evaporation gas through the dual purge line in the dual purge system applying a turbocharger.

A method for diagnosing leakage of a fuel vapor dual purge system including a first purge line connected from a fuel tank to an intake side of an engine and a second purge line connected from the fuel tank to the intake side via a turbocharger, may include: determining whether an operation region of a vehicle is an operation region in which the turbocharger is operated by a controller; adjusting a flow amount of intake air that flows into the turbocharger according to an operation region in which the turbocharger is operated by the controller; calculating a hydrocarbon collecting amount of a canister connecting fuel vapor generated in the fuel tank by the controller; adjusting a flow amount of the fuel vapor passing first and second purge lines by the controller; and determining whether a leak of the fuel vapor is generated in the first purge line and the second purge line.

A main purge line may be connected to the fuel tank; a first auxiliary purge line and a second auxiliary purge line may be branched from the main purge line; the first purge line may be formed by the main purge line and the first auxiliary purge line; and the second purge line may be formed by the main purge line and the second auxiliary purge line. A purge control solenoid valve configured to adjust a flow amount of the fuel vapor may be installed at the main purge line; and first and second check valves may prevent a reverse flow of the fuel vapor may be respectively installed at the first auxiliary purge line and the second auxiliary purge line.

A second intake line may be configured to guide the intake air to the turbocharger and a first intake line may be configured to guide the intake air passing through the turbocharger to the engine. A differential pressure valve configured to adjust a flow amount of the intake air that flows into the turbocharger may be installed at the second intake line and a pressure sensing line may be connected to the second intake line between the differential pressure valve and the turbocharger. A pressure sensor configured to sense a pressure may be installed at the pressure sensing line and a rear end of the second check valve installed at the second auxiliary purge line may be connected to the pressure sensing line.

An intercooler reducing a temperature of the intake air passing through the turbocharger through heat exchange, and an electric throttle control valve configured to adjust the flow amount of the intake air passing through the first intake line according to an operation of an accelerator pedal of the driver, may be installed at the first intake line. An EGR valve configured to adjust and supply an EGR gas and an EGR cooler configured to reduce a temperature of the EGR gas may be connected to the second intake line between the differential pressure valve and the turbocharger.

The determination of whether the leak of the fuel vapor is generated in the first purge line and the second purge line may include: a first leak diagnosis process diagnosing the leak of the fuel vapor at a line until the main purge line and a leading end of the second check valve of the first auxiliary purge line and the second auxiliary purge line in a region in which the turbocharger is not operated; a second leak diagnosis process diagnosing the leak of the fuel vapor at the pressure sensing line in an operation region in which the turbocharger is operated; and a diagnosis process of detecting a failure of the second check valve.

A manifold absolute pressure (MAP) sensor may be installed at the first intake line passing through the electric throttle control valve. In the first leak diagnosis process, if a change rate of the pressure of the fuel tank according to the pressure sensed using the MAP sensor exceeds a predetermined range, the leak may be determined to be generated at the first leak diagnosis line. If the pressure change rate of the fuel tank is within a predetermined range, the leak may be determined to not be generated in the first leak diagnosis line (e.g., a normal state).

The second leak diagnosis process may include determining whether the pressure sensed using the pressure sensor of the pressure sensing line is less than atmospheric pressure. When the pressure of the pressure sensing line is a negative pressure, the pressure sensor is may be determined to be normal and the connection state of the rear end of the second check valve and the pressure sensing line may be determined to be normal. When the pressure of the pressure sensing line is not the negative pressure, the failure of the pressure sensor or the connection failure of the rear end of the second check valve and the pressure sensing line may be detected.

In the process of diagnosing the failure of the second check valve, whether the pressure inside the fuel tank is less than a predetermined value may be determined. A failure of the second check valve may be detected when the pressure inside the fuel tank is a predetermined value or greater and the second check valve may be determined to be normal when the pressure inside the fuel tank is less than a predetermined value.

According to the leakage diagnosis method of the fuel vapor dual purge system according to an exemplary embodiment of the present invention, as the fuel evaporation gas leakage of the first purge line connected from the fuel tank to the intake side of the engine may be more accurately diagnosed in the region in which the turbocharger is not operated, and the fuel evaporation gas leakage of the second purge line connected from the fuel tank to the turbocharger, the failure of the check valve, and the leakage of the connection line may be more accurately diagnosed in the region in which the turbocharger is operated, the diagnosis accuracy of the fuel evaporation gas leakage may be improved, and accordingly, the leakage of the fuel evaporation gas may be prevented, the environmental pollution may be reduced, and the fuel consumption of the vehicle may be improved.

BRIEF DESCRIPTION OF THE DRAWINGS

In the following detailed description, exemplary embodiments of the present invention have been shown and described, by way of illustration, in which.

DETAILED DESCRIPTION

Figure 1:
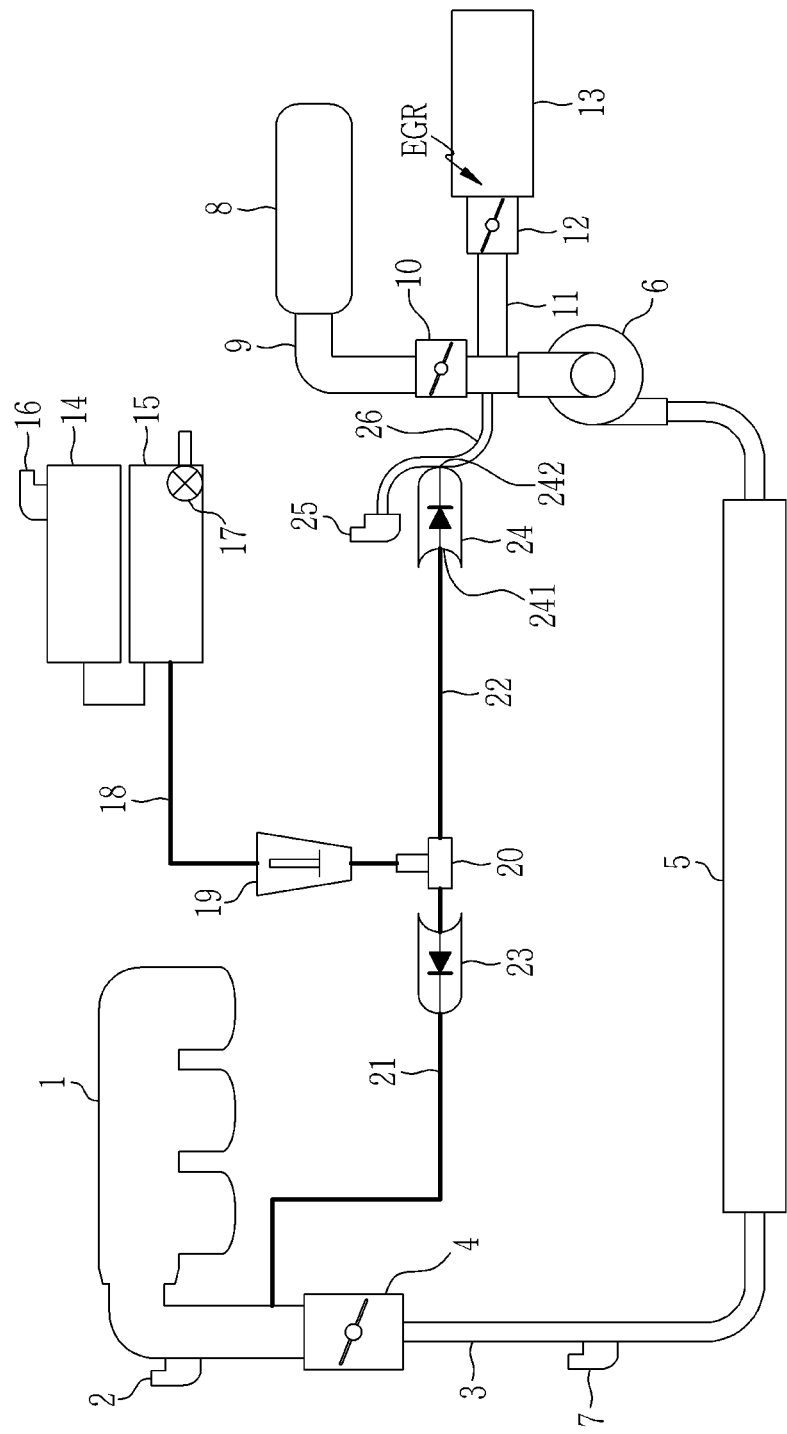
FIG. 1 is a schematic view showing a configuration of a fuel vapor dual purge system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

In order to clarify the present invention, parts that are not connected with the description will be omitted, and the same elements or equivalents are referred to with the same reference numerals throughout the specification. Also, the size and thickness of each element are arbitrarily shown in the drawings, but the present invention is not necessarily limited thereto, and in the drawings, the thickness of layers, films, panels, regions, etc., are exaggerated for clarity.

A method for diagnosing a leakage of a fuel evaporation gas of a fuel vapor dual purge system according to an exemplary embodiment of the present invention will be described in detail with reference to accompanying drawings. Referring to FIG. 1, in a fuel vapor dual purge system applied with a method for diagnosing a leakage according to an exemplary embodiment of the present invention, a manifold absolute pressure (MAP) sensor 2 configured to adjust intake air to be supplied to an intake manifold of an engine may be attached to a surge tank 1 to sense an intake air pressure.

In particular, to adjust an intake air amount flowing into the surge tank 1 according to an engagement of an accelerator pedal by a driver, an electric throttle control (ETC) valve 4 may be installed at a first intake line 3 connected to the surge tank 1. An intercooler 5 configured to decrease a temperature of the intake air through heat exchange may be installed at the first intake line 3, and a compressor 6 of a turbocharger may be connected to a leading end of the intercooler 5. While the compressor 6 is operated by receiving power of a turbine operated by exhaust gas of the engine, the intake air may be compressed to be supplied to the first intake line 3, and the intercooler 5 may be configured to cool the intake air having an increased temperature by the compression of the compressor 6 to be supplied to the engine.

Additionally, to sense an intake pressure that is increased by the compressor 6, a boost sensor 7 may be installed at the first intake line 3 between the electric throttle control valve 4 and the intercooler 5. An air cleaner 8 may be connected to an inlet of the compressor 6 via a second intake line 9 such as an air hose, and the air cleaner 8 may be configured to out a foreign material of the intake air flowing into the compressor 6. A differential pressure valve 10 may be installed at the second intake line 9 between the air cleaner 8 and the compressor 6 to adjust the flow amount of the external air flowing through the second intake line 9 based on the opening and closing of the differential pressure valve 10.

A recirculation gas passage 11 configured to recirculate a part of the exhaust gas to the engine side may be connected to the second intake line 9 connecting the differential pressure valve 10 and the compressor 6, and an exhaust gas recirculation (EGR) valve 12 configured to adjust the flow amount of the recirculation gas and an EGR cooler 13 configured to decrease the temperature of the recirculation gas through the heat exchange with the recirculation gas may be respectively installed at the recirculation gas passage 11. Additionally, to collect the fuel evaporation gas evaporated from a fuel tank 14, a canister 15 may be connected to the fuel tank 14, a fuel pressure sensor 16 configured to sense the fuel pressure in the fuel tank 14 may be installed at the fuel tank 14, and a canister control valve (CCV) 17 configured to control the fuel evaporation gas collected at the canister 15 may be installed at the canister 15.

Further, to supply the fuel evaporation gas collected in the canister 15 to the intake side of the engine to be combusted, a first end of a main purge line 18 may be connected to the canister 15, and a purge control solenoid valve (PCSV) 19 may be installed at the main purge line 18 to adjust the supply of the fuel evaporation gas through the main purge line 18. A first end of each of a first auxiliary purge line 21 and a second auxiliary purge line 22 may be connected through a coupler 20 at a second end of the main purge line 18, a second end of the first auxiliary purge line 21 may be connected to the first intake line 3 between the electric throttle control valve 4 and the surge tank 1, and the fuel evaporation gas of the canister 15 may be supplied to the engine via the first intake line 3 through the main purge line 18 and the first auxiliary purge line 21 and is combusted.

In particular, to prevent the intake air of the first intake line 3 from reversely flowing to the first auxiliary purge line 21, a first check valve (CV1; 23) may be installed at the first auxiliary purge line 21. A pressure sensor 25 configured to sense the pressure may be connected to the second intake line 9 between the compressor 6 of the turbocharger and the differential pressure valve 10 through the pressure sensing line 26. The pressure sensor 25 is installed at a first end of the pressure sensing line 26, and a second end thereof may be connected to the second intake line 9 between the compressor 6 of the turbocharger and the differential pressure valve 10. The second end of the second auxiliary purge line 22 may be connected to a pressure sensing line 26 and may be connected to the second intake line 9 via the pressure sensing line 26.

Accordingly, the fuel evaporation gas of the canister 15 may be supplied to the engine via the second intake line 9 through the main purge line 18, and the second auxiliary purge line 22 and the pressure sensing line 26, and may be combusted. In addition, a second check valve (CV2; 24) may be installed at the second auxiliary purge line 22 to prevent the intake air flowing along the second intake line 9 from reversely flowing to the second auxiliary purge line 22.

Figure 2:
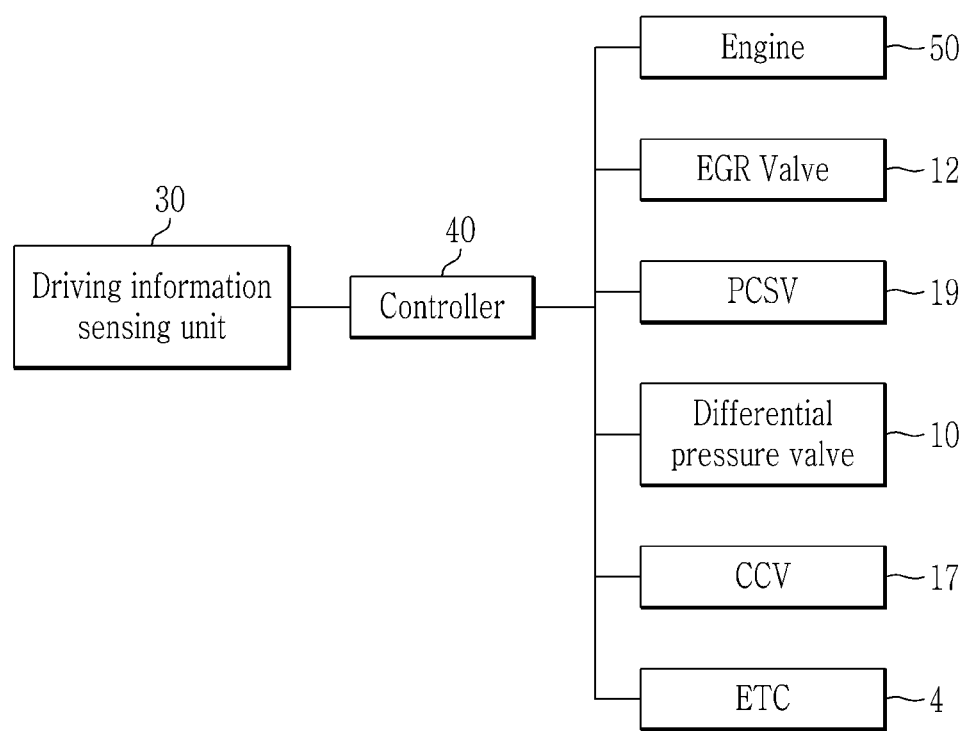
FIG. 2 is a block diagram showing a configuration of a fuel vapor dual purge system according to an exemplary embodiment of the present invention.

Referring to FIG. 2, a driving information sensing unit 30 configured to sense driving information including a required torque of the driver, a required speed, an engine speed, and an engine load, and the driving information may be transmitted to a controller 40. In particular, the required torque and the required speed of the driver may be sensed using an acceleration pedal sensor (APS) provided within the vehicle, the engine torque may be sensed using a torque sensor, and the engine speed may be sensed using a speed sensor.

The controller 40 may be an engine control unit (ECU) mounted within the vehicle. Particularly, the controller 40 may be configured to sense the driving information of the vehicle using various detection signals input from the driving information sensing unit 30. Accordingly, the controller 40 may be configured to generate various control signals based on the detection signals to operate an engine 50, the turbocharger, the EGR valve 12, the canister 15, the purge control solenoid valve 19, the canister control valve 17, the differential pressure valve 10, etc. The controller 40 may thus include at least one processor operated by a predetermined program, and the predetermined program performs each step of the method for diagnosing the leakage of the fuel vapor (fuel evaporation gas) purge system according to an exemplary embodiment of the present invention.

Figure 3:
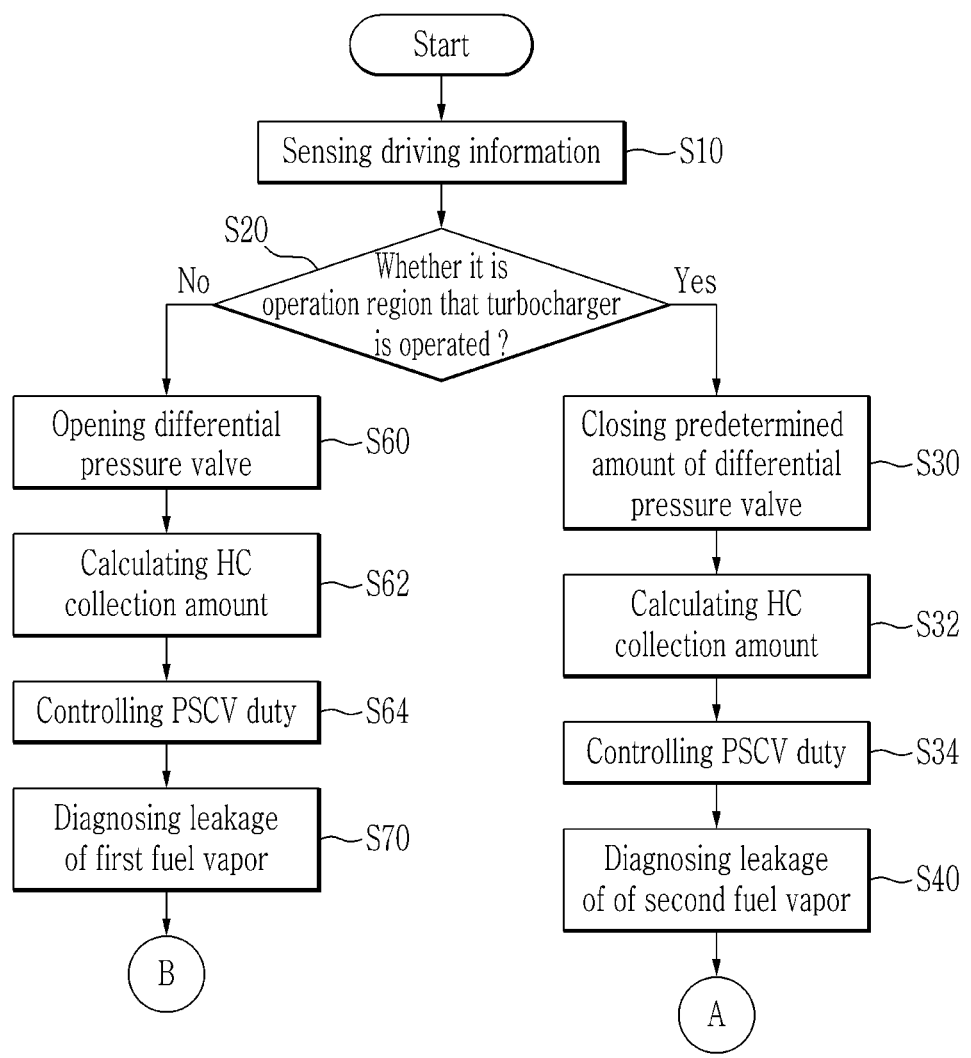
FIG. 3 to FIG. 5 are flowcharts showing a method for diagnosing a leakage of a fuel evaporation gas of a fuel vapor dual purge system according to an exemplary embodiment of the present invention.

Hereinafter, the operation of the fuel vapor dual purge system and the method for diagnosing the leakage according to an exemplary embodiment of the present invention will be described in detail with reference to FIG. 3. As shown in FIG. 3, the driving information sensing unit 30 may be configured to sense the driving information including the required torque, the required speed, the engine speed, and the engine load of the driver (S10). The sensing unit 30 may include the various sensors discussed above. The driving information sensed by the driving information sensing unit 30 may be transmitted to the controller 40.

Additionally, the driving information sensing unit 30 may be configured to sense the fuel pressure of the fuel tank 14 using the fuel pressure sensor 16, sense the pressure of the intake manifold side using the MAP sensor 2, and sense the pressure of the second intake line 9 between the differential pressure valve 10 and the compressor 6 using the pressure sensor 25 to be transmitted to the controller 40. The controller 40 may be configured to determine whether an operation region of the vehicle is an operation region in which the turbocharger is operated from the driving information (S20). For example, the operation region in which the turbocharger is operated may be a high speed and high load region, and the operation region in which the turbocharger is not operated may be a low speed and low load region.

When the operation region of the vehicle is the operation region in which the turbocharger is not operated, the controller 40 may be configured to open the differential pressure valve 10. The intake air may thus flow into the engine through the intake manifold via the second intake line 9 and the first intake line 3 when the differential pressure valve 10 is opened. In the non-operation process of the turbocharger, the controller 40 may be configured to calculate a hydrocarbon collecting amount of the canister 15 (S62). The controller 40 may further be configured to calculate a hydrocarbon concentration of the canister 15 from an air amount inflowing to the engine 50 and an oxygen amount included in the exhaust gas, thereby calculating the hydrocarbon collecting amount therefrom.

Further, the controller 40 may be configured to perform duty control of the purge control solenoid valve 19 based on the hydrocarbon collecting amount (S64), and adjust the exhausted fuel vapor amount according thereto. The first check valve 23 may be opened by the negative pressure formed at the intake manifold, and the fuel vapor exhausted through the purge control solenoid valve 19 may flow into the engine through the first auxiliary purge line 21 and the first check valve 23 via the intake manifold and may be combusted.

Figure 4:
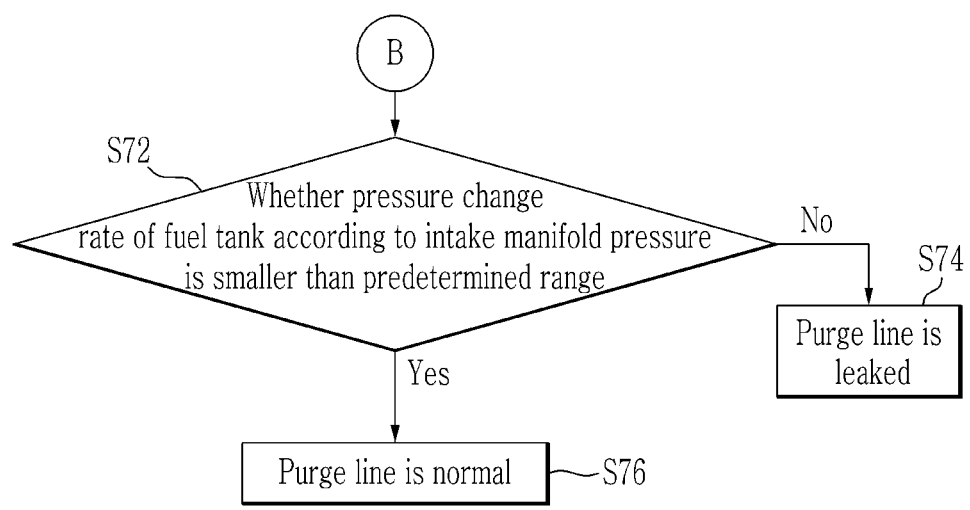
Figure 5:
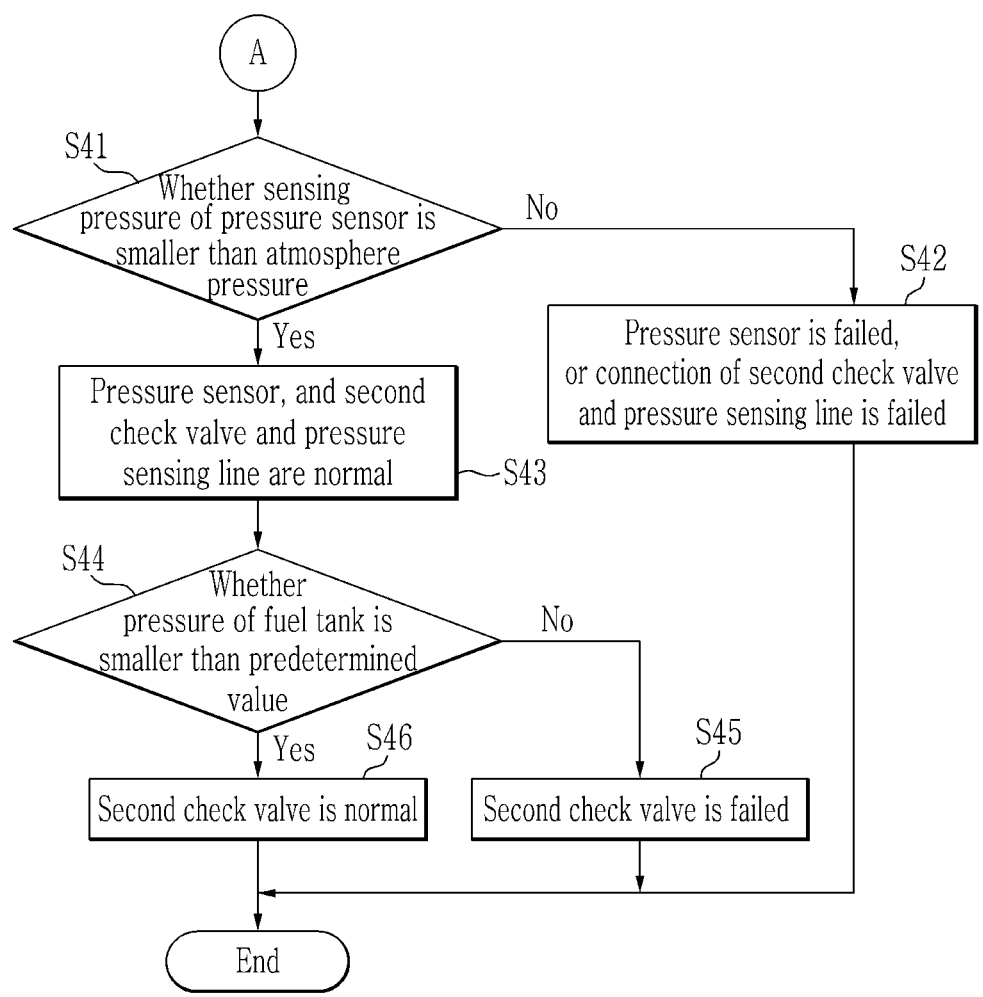

In particular, the controller 40 may be configured to execute a first leak diagnosis process which may include determining whether the leak of the fuel vapor is generated in the fuel vapor dual purge system (S70). In other words, the controller 40 may be configured to determine whether the fuel vapor is leaked in a line (hereinafter referred to as a first leak diagnosis line) until the main purge line 18 and a leading end 241 of the second check valve 24 of the first auxiliary purge line 21 and the second auxiliary purge line 22. In other words, as shown in FIG. 4, the controller 40 may be configured to determine whether a change rate of the pressure of the fuel tank 14 sensed in the fuel pressure sensor 16 of the fuel tank 14 based on the pressure of the intake manifold sensed using the MAP sensor 2 is within a predetermined range (S72). Particularly, the pressure change rate of the fuel tank according to the intake manifold pressure may be previously stored in the controller in a map data form.

When the pressure change rate of the fuel tank according to the intake manifold pressure exceeds the predetermined range, the leak may be detected in the first leak diagnosis line (S74). However, when the pressure change rate of the fuel tank according to the intake manifold pressure is within the predetermined range, the controller 40 may be configured to determine that the leak is not generated in the first leak diagnosis line (e.g., a normal state) (S76). When the operation region of the vehicle is the operation region in which the turbocharger is operated, the controller 40 may be configured to close the differential pressure valve 10 by a predetermined amount that is less than a maximum closing amount (S30) to form a negative pressure at the second intake line 9 between the differential pressure valve 10 and the leading end of the compressor 6 of the turbocharger.

In particular, the magnitude of the negative pressure formed at the second intake line 9 may be determined by the closing amount of the differential pressure valve 10, and the closing amount of the differential pressure valve 10 is less than the maximum closing amount.

The maximum closing amount may be determined by the required intake air amount of the engine and a flow speed of the intake air according to the opening of the differential pressure valve 10. The required intake air amount of the engine may be determined from the required torque of the driver.

When the differential pressure valve 10 is closed by the predetermined amount, the negative pressure is formed at the leading end of the compressor 6, however since the intake air amount supplied to the engine 50 through the intake lines is reduced, when the differential pressure valve 10 is excessively closed, the intake air is reduced preventing the output of the engine from being maintained. Accordingly, the closing amount of the differential pressure valve 10 to maintain the output of the engine determined from the required torque of the driver becomes the maximum closing amount. In particular, the output of the engine, the closing amount of the differential pressure valve according to the required intake air amount, and the maximum closing amount may be previously stored in the controller 40 as the map table form.

The controller 40 may be configured to calculate the hydrocarbon collecting amount of the canister 15 (S32). In particular, the controller 40 may be configured to calculate the hydrocarbon concentration of the canister 15 from the air amount flowing into the cylinder of the engine 50 and the oxygen amount included in the exhaust gas, thereby calculating the hydrocarbon collecting amount according thereto. The method of calculating the hydrocarbon collecting amount is obvious to ordinary technicians in the technical field of the present invention, so specific descriptions are omitted. The controller 40 may be configured to perform the duty control of the purge control solenoid valve 19 based on the hydrocarbon collecting amount (S34), thereby adjusting the exhausted fuel vapor amount. Particularly, since the first check valve 23 may be blocked by the negative pressure formed at the second intake line 9 of the leading end of the compressor 6 by the differential pressure valve 10 and the second check valve 24 may be opened, the fuel vapor exhausted through the purge control solenoid valve 19 may be supplied to the engine 50 through the first intake line 3 via the second check valve 24 and the second intake line 9 and the compressor 6.

Moreover, the controller 40 may further be configured to execute a second leak diagnosis process which may include diagnosing whether the fuel vapor of the pressure sensing line 26 (referred to as a second leak diagnosis line) in the fuel vapor dual purge system leaks (S40). In other words, the controller 40 may be configured to determine whether the pressure sensed using the pressure sensor 25 is the negative pressure that is less than atmospheric pressure (S41). When the turbocharger is operated, the negative pressure is generated at the second intake line 9 between the differential pressure valve 10 and the compressor 6 of the turbocharger by the closing of the predetermined amount of the differential pressure valve 10, and the negative pressure also acts at the pressure sensing line 26 connected to the second intake line 9, and accordingly the pressure sensed using the pressure sensor 25 becomes the negative pressure that is less than the atmospheric pressure.

When the negative pressure is sensed, the controller 40 may be configured to determine that the pressure sensor 25 is operated normally (e.g., without malfunction or leak). Additionally, since a rear end 242 of the second check valve 24 may be connected to the pressure sensing line 26, the controller 40 may be configured to determine that the connection stage of the rear end 242 of the second check valve 24 and the pressure sensing line 26 are the normal state in which the leak is not generated. When the pressure sensed using the pressure sensor 25 is not the negative pressure, that the controller 40 may be configured to detect a malfunction or error of the pressure sensor 25, and detect generation of the leak in the connection state of the rear end 242 of the second check valve 24 and the pressure sensing line 26 (S42). However, when the pressure is the negative pressure, the controller 40 may be configured to determine that the pressure sensor 25 is normal and the connection state of the rear end 242 of the second check valve 24 and the pressure sensing line 26 is normal (S43).

Further, the controller may be configured to diagnose a failure of the second check valve 24 as described below (S43). Since the negative pressure also acts on the fuel tank 14 through the second check valve 24 via the second auxiliary purge line 22, the controller 40 may be configured to determine whether the pressure inside the fuel tank 14 is less than a predetermined value, that is, a predetermined value mapped in the controller 40, through the fuel pressure sensor 16 installed at the fuel tank 14 (S44). When the pressure inside the fuel tank is the predetermined value or greater, that the controller 40 may be configured to detect a malfunction or error of the second check valve 24 (S45). When the pressure inside the fuel tank is less than the predetermined value, the controller 40 may be configured to determine that the second check valve 24 is normal (S46).

As above-described, according to an exemplary embodiment of the present invention, as the leak existence of the fuel vapor may be diagnosed more accurately in the fuel vapor dual purge system, the environmental pollution due to the leak of the fuel vapor and the productivity deterioration of the vehicle may be effectively prevented, and in addition, the fuel consumption of the vehicle may be also improved by the appropriate usage of the fuel vapor.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

1: surge tank
2: MAP sensor
3: intake line
4: electric throttle control valve
5: intercooler
6: compressor
7: boost sensor
8: air cleaner
9: second intake line
10: differential pressure valve
11: recirculation gas passage
12: EGR valve
13: EGR cooler
14: fuel tank
15: canister
16: pressure sensor
17: canister control valve
18: main purge line
19: purge control solenoid valve
20: coupler
21: first auxiliary purge line
22: second auxiliary purge line
23: first check valve
24: second check valve
25: pressure sensor
26: pressure sensing line
30: driving information sensing unit
40: controller
50: engine

What is claimed is:

1. A method for diagnosing leakage of a fuel vapor dual purge system including a first purge line connected from a fuel tank to an intake side of an engine and a second purge line connected from the fuel tank to the intake side via a turbocharger, comprising:
    determining, by a controller, whether an operation region of a vehicle is an operation region in which the turbocharger is operated;
    adjusting, by the controller, a flow amount of intake air flowing into the turbocharger according to an operation region in which the turbocharger is operated;
    calculating, by the controller, a hydrocarbon collecting amount of a canister connecting fuel vapor generated in the fuel tank;
    adjusting, by the controller, a flow amount of the fuel vapor passing first and second purge lines by operating a purge control solenoid valve installed at the main purge line; and
    determining, by the controller, whether a leak of the fuel vapor is generated in the first purge line and the second purge line,
    wherein first and second check valves preventing a reverse flow of the fuel vapor are respectively installed at the first auxiliary purge line and the second auxiliary purge line,
    wherein a second intake line guides the intake air to the turbocharger and a first intake line guides the intake air passing through the turbocharger to the engine,
    wherein the flow amount of the intake air flowing into the turbocharger is adjusted by operating a differential pressure valve installed at the second intake line,
    wherein a pressure sensor is installed at a pressure sensing line connected to the second intake line between the differential pressure valve and the turbocharger and is configured to sense pressure,
    wherein a rear end of the second check valve installed at the second auxiliary purge line is connected to the pressure sensing line,
    wherein the determining of whether the leak of the fuel vapor is generated in the first purge line and the second purge line includes:
        diagnosing, by the controller, the leak of the fuel vapor at a line until the main purge line and a leading end of the second check valve of the first auxiliary purge line and the second auxiliary purge line in a region in which the turbocharger is not operated;

diagnosing, by the controller, the leak of the fuel vapor at the pressure sensing line in an operation region in which the turbocharger is operated;

detecting by the controller, a failure of the second check valve;

determining by the controller, whether the pressure sensed using the pressure sensor of the pressure sensing line is less than atmospheric pressure;

determining by the controller, that the pressure sensor is normal and the connection state of the rear end of the second check valve and the pressure sensing line is normal when the pressure of the pressure sensing line is a negative pressure, and detecting, by the controller, a failure of the pressure sensor or the connection failure of the rear end of the second check valve and the pressure sensing line when the pressure of the pressure sensing line is not the negative pressure, and wherein the diagnosing of the failure of the second check valve includes:

determining by the controller, whether the pressure inside the fuel tank is less than a predetermined value, detecting, by the controller, a failure of the second check valve when the pressure inside the fuel tank is a predetermined value or greater; and detecting, by the controller, that the second check valve is normal when the pressure inside the fuel tank is less than a predetermined value.

2. The method of claim 1, wherein:
a main purge line is connected to the fuel tank;
a first auxiliary purge line and a second auxiliary purge line are branched from the main purge line;
the first purge line is formed by the main purge line and the first auxiliary purge line; and
the second purge line is formed by the main purge line and the second auxiliary purge line.

3. The method of claim 1, further comprising:
reducing, by the controller, a temperature of the intake air passing through the turbocharger through heat exchange by operation of an intercooler; and
adjusting, by the controller, the flow amount of the intake air passing through the first intake line by operating an electric throttle control valve according to an operation of an accelerator pedal of the driver,
wherein the intercooler and the electric throttle control valve are installed at the first intake line.

4. The method of claim 1, further comprising:
adjusting and supplying, by the controller, an exhaust gas recirculation (EGR) gas by operating an EGR valve; and
reducing, by the controller, a temperature of the EGR gas by operating an EGR cooler,
wherein the EGR valve and the EGR cooler are connected to the second intake line between the differential pressure valve and the turbocharger.

5. The method of claim 1, further comprising:
detecting, by the controller, the leak at a first leak diagnosis line when a change rate of the pressure of the fuel tank according to the pressure sensed using a manifold absolute pressure (MAP) sensor installed at the first intake line passing through the electric throttle control valve exceeds a predetermined range; and
detecting, by the controller, a normal state of the first leak diagnosis line, when the pressure change rate of the fuel tank is within a predetermined range.

6. A leakage diagnosis system, comprising:
a first purge line connected from a fuel tank to an intake side of an engine and a second purge line connected from the fuel tank to the intake side via a turbocharger;
a main purge line connected to the fuel tank;
a first auxiliary purge line and a second auxiliary purge line branched from the main purge line, wherein the first purge line is formed by the main purge line and the first auxiliary purge line and the second purge line is formed by the main purge line and the second auxiliary purge line;
a controller configured to:
determine whether an operation region of a vehicle is an operation region in which the turbocharger is operated;
adjust a flow amount of intake air flowing into the turbocharger according to an operation region in which the turbocharger is operated;
calculate a hydrocarbon collecting amount of a canister connecting fuel vapor generated in the fuel tank;
adjust a flow amount of the fuel vapor passing first and second purge lines; and
determine whether a leak of the fuel vapor is generated in the first purge line and the second purge line,
a purge control solenoid valve installed at the main purge line to adjust a flow amount of the fuel vapor;
first and second check valves preventing a reverse flow of the fuel vapor respectively installed at the first auxiliary purge line and the second auxiliary purge line;
a second intake line guiding the intake air to the turbocharger and a first intake line guiding the intake air passing through the turbocharger to the engine;
a differential pressure valve installed at the second intake line installed at the second intake line and configured to adjust a flow amount of the intake air flowing into the turbocharger; and
a pressure sensor is installed at a pressure sensing line connected to the second intake line between the differential pressure valve and the turbocharger and is configured to sense pressure,
wherein a rear end of the second check valve installed at the second auxiliary purge line is connected to the pressure sensing line,
wherein in the determining of whether the leak of the fuel vapor is generated in the first purge line and the second purge line the controller is further configured to:
diagnose the leak of the fuel vapor at a line until the main purge line and a leading end of the second check valve of the first auxiliary purge line and the second auxiliary purge line in a region in which the turbocharger is not operated;
diagnose the leak of the fuel vapor at the pressure sensing line in an operation region in which the turbocharger is operated;
detect a failure of the second check valve;
determine whether the pressure sensed using the pressure sensor of the pressure sensing line is less than atmospheric pressure;
determine that the pressure sensor is normal and the connection state of the rear end of the second check valve and the pressure sensing line is normal when the pressure of the pressure sensing line is a negative pressure; and
detect a failure of the pressure sensor or the connection failure of the rear end of the second check valve and the pressure sensing line when the pressure of the pressure sensing line is not the negative pressure, and wherein in the diagnosing of the failure of the second check valve the controller is further configured to:
determine whether the pressure inside the fuel tank is less than a predetermined value;
detect a failure of the second check valve when the pressure inside the fuel tank is a predetermined value or greater, and
detect that the second check valve is normal when the pressure inside the fuel tank is less than a predetermined value.

* * * * *